United States Patent [19]

Klomp

[11] Patent Number: 4,945,869
[45] Date of Patent: Aug. 7, 1990

[54] TWO CYCLE CRANKCASE VARIABLE INLET TIMING

[75] Inventor: Edward D. Klomp, Mount Clemens, Mich.

[73] Assignee: General Motors Corporation, Detroit, Mich.

[21] Appl. No.: 369,218

[22] Filed: Jun. 21, 1989

[51] Int. Cl.⁵ .............................................. F02B 33/04
[52] U.S. Cl. .................. 123/73 V; 123/90.11
[58] Field of Search ............ 123/73 AE, 73 C, 73 V, 123/198 F, 90.11, 73 R

[56] References Cited

U.S. PATENT DOCUMENTS

| | | |
|---|---|---|
| 2,289,201 | 7/1942 | Martin . |
| 2,428,199 | 9/1947 | Buske ................................ 123/73 V |
| 2,428,791 | 10/1947 | Earnshaw . |
| 4,258,670 | 3/1981 | Thery ................................ 123/73 V |
| 4,777,915 | 10/1988 | Bonvallet ......................... 123/90.11 |
| 4,829,947 | 5/1989 | Lequesne . |

FOREIGN PATENT DOCUMENTS

| | | | |
|---|---|---|---|
| 497798 | 9/1954 | Italy ................... | 123/73 V |
| 150381 | 9/1920 | United Kingdom ............. | 123/73 V |
| 623476 | 5/1949 | United Kingdom ............. | 123/73 V |
| 1241191 | 7/1971 | United Kingdom ............. | 123/73 V |

*Primary Examiner*—David A. Okonsky
*Attorney, Agent, or Firm*—Robert J. Outland

[57] ABSTRACT

A crankcase scavenged two cycle engine has a variable timing poppet inlet valve on the crankcase inlet. The valve timing is altered for load control with minimum air pumping loss and open periods may be skipped during skip firing of the engine cylinders for improved efficiency.

4 Claims, 2 Drawing Sheets

TWO CYCLE CRANKCASE VARIABLE INLET TIMING

TECHNICAL FIELD

This invention relates to two-stroke-cycle engines commonly referred to as two cycle engines. More particularly, the invention relates to crankcase inlet control for crankcase scavenged two cycle engines.

BACKGROUND

Conventional two cycle, spark-ignited engines have a reputation for erratic operation at light loads. If the engine is highly throttled the residual fraction becomes very large (70 to 90 percent of the trapped charge), excessively diluting the fresh charge and resulting in misfires or incomplete combustion. If the engine is not throttled the fuel-air ratio is outside the bounds of ignitability. Even adding direct fuel injection, in an attempt to achieve charge stratification, does not permit the two cycle engine to accommodate light loads as well as the four cycle engine.

Such conventional two cycle engines generally employ a scavenging system which includes piston-controlled intake and exhaust ports and air supplied by crankcase compression. When the piston moves upward on the cylinder compression stroke, it increases the volume of the crankcase, lowering the pressure, and causes atmospheric air to enter the crankcase through an intake system. The intake system includes a throttle for flow control and, downstream close to the crankcase, a set of reed check valves which automatically open inwardly to the crankcase in response to a depressed crankcase pressure allowing fresh charge to enter. When the piston moves downward on the cylinder expansion stroke, the volume in the crankcase is reduced, the reed valves automatically close preventing gas escape from the crankcase, and the pressure is increased until the intake port is uncovered by the piston. Then fresh charge from the crankcase enters the combustion chamber forcing the products of combustion out of the chamber through the exhaust port.

At maximum load, corresponding to wide-open throttle, the pressure drop across the reeds reduces the mass of fresh charged delivered to the engine. Furthermore, if crankcase pressure becomes equal to atmospheric pressure during upward piston motion prior to intake port closure, the fraction of reverse flow through the transfer ports will be decreased if the resistance to flow offered by the reed valves can be decreased.

Part-load operation is achieved by closing the throttle until the fresh-charge mass flow rate matches that required by the engine load demands. This depresses the crankcase pressure during the engine compression stroke and produces pumping losses. The processes within the crankcase are illustrated in FIG. 1 on a pressure-volume diagram where the net pumping work is represented by the shaded area.

SUMMARY OF THE INVENTION

The present invention employs an external system to positively actuate one or more valves to control the flow between the intake system and the crankcase. Such a system may be advantageous under most engine operating conditions. At full load the system could open more quickly and reduce the pressure drop of the flow entering the crankcase. The result would be to increase the mass flow rate of fresh charge through the engine, leading to a larger mass of trapped charge in the combustion chamber and increased power output.

At part load positive actuation of the crankcase flow control valve or valves permits the throttle to be eliminated and therefore pumping losses to be reduced. For this mode of load control the crankcase valve would be held open through the entire piston compression stroke so that the crankcase would experience very little pressure depression below ambient. A crankcase fresh charge corresponding to that required at full load results when the piston reaches TDC. Continuing to hold the crankcase valve open during the expansion stroke permits unneeded fresh charge to be returned to the intake system. The valve is only closed when the net mass of flow inducted into and remaining in the crankcase matches load requirements. Then charge compression within the crankcase proceeds until intake port opening allows fresh charge to enter the combustion chamber. The result is reduced pumping work.

The crankcase processes may be visualized with the help of FIG. 2. Since the crankcase flow control valve is fully open, the pressure depression is minimal during the entire engine compression stroke. When the piston moves downward on the engine power stroke, crankcase pressure rises slightly above ambient pressure and flow is forced back out of the crankcase until the net increase in crankcase gas mass matches that required by the engine load, at which time the valve is closed. From the piston position on, compression of crankcase gas proceeds until intake port opening permits fresh charge to enter the combustion chamber. The net pumping work per cycle is represented by the shaded area on FIG. 2. Comparing FIGS. 1 and 2 illustrates the reduction in pumping work by exercising positive control over the crankcase flow.

It is recognized that a wide variety of valve geometries and actuation systems could be employed to produce the results discussed previously. However, a lightweight poppet valve would seem to serve the purpose quite well. Actuation of such a valve could be accomplished by a hydraulic control system or by an electrical system. FIG. 3 shows a proposed solenoid-actuated poppet valve system in place of the reed system.

This invention also prescribes a further solution to poor light-load operation of the two cycle engine. If one or more cylinders were prevented from firing every revolution, the output demanded for each firing would be increased and cyclic variability would be reduced. For electronic fuel injection, fuel introduction for a non-firing cycle could be eliminated readily, but scavenge air flow through the cylinder would cause an excessive reduction in the average exhaust gas temperature and impede performance of the converter. In addition, the increased purity of the charge resulting from multiple scavenging could produce a charge too lean to burn when combustion was desired. The positively-actuated crankcase flow control valve systems, discussed previously can be operated to eliminate scavenging for non-firing, or skipped cycles.

These valve systems, such as the one illustrated in FIG. 3, replace the reed valves used in conventional engines employing crankcase scavenging. When these valves are electrically operated and controlled, they can easily be held closed prior to non-firing cycles. If the valve is held closed, fresh air cannot be drawn into the crankcase during a cylinder compression stroke and will not be delivered during the subsequent intake port open duration. Alternatively, the crankcase flow control valve could be held open. This would allow fresh charge to enter the crankcase but would prevent its compression and cause it to be returned to the intake system.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
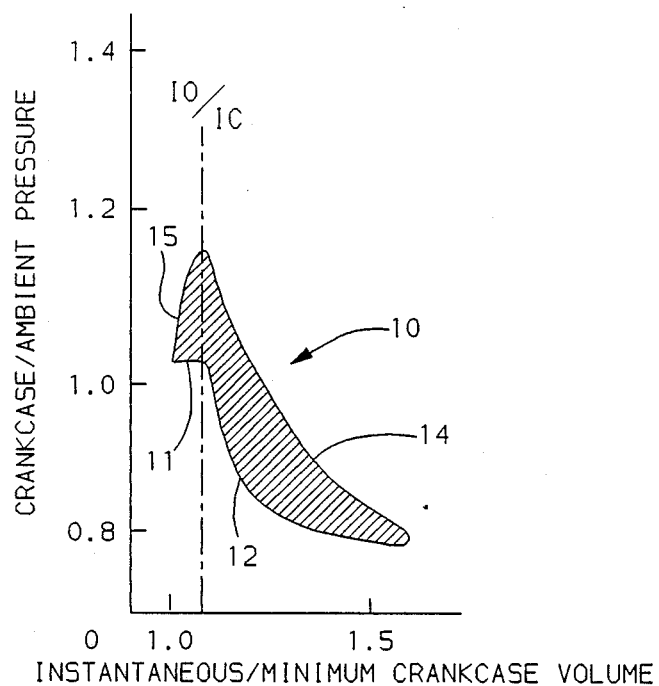
FIG. 1 is a graph of the crankcase pumping loop for an engine with conventional load control by crankcase inlet throttling.

Referring now to the drawings in detail, in the graph of FIG. 1 numeral 10 indicates a closed curve representing the crankcase pumping loop for a spark ignited two cycle engine with conventional throttle valve load control set for part throttle operation. The scale of the abcissa (x axis) indicates the ratio of instantaneous crankcase volume to the minimum crankcase volume while the ordinate (y axis) indicates the ratio of crankcase pressure to ambient pressure.

In the pumping loop curve 10, line 11 essentially constant crankcase pressure during movement of the piston upward from the bottom dead center position with a volume ratio of 1.0 to the point where the intake port is closed. Line 12 shows the pressure reduction due to intake throttling during further piston upward motion to maximum crankcase volume. Downward piston motion then increases crankcase pressure while reducing volume along line 14 until the intake port again opens. The pressurized gas is then discharged into the connected cylinder and the pressure is reduced along line 15 to the initial pressure level.

Figure 2:
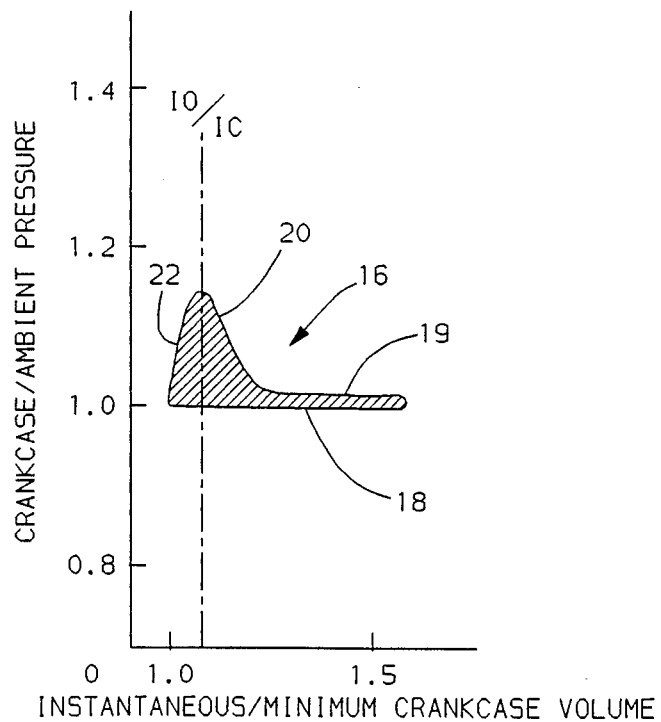
FIG. 2 is a graph similar to FIG. 1 for an engine with load control by a timed crankcase inlet poppet valve according to the invention.

In FIG. 2, the pumping loop curve 16 for the timed valve load control of this invention represents comparable part throttle operation. With the intake valve open, the crankcase pressure drops only slightly as the piston moves upward increasing the crankcase volume from the minimum to the maximum along line 18. The valve remains open as the piston moves downward, again reducing crankcase volume along line 19 and discharging a portion of the intake charge back into the intake system. Closing of the intake valve causes compression of the remaining crankcase charge along line 20 as the piston moves to the point of intake port opening. Discharge into the cylinder then reduces the crankcase pressure along line 22 as in the conventional throttling mode.

An increase in cycle efficiency results from the substantial reduction in pumping work indicated by the smaller area of the pumping loop curve 16 of the invention as compared to the curve 10 for conventional throttling.

Figure 3:
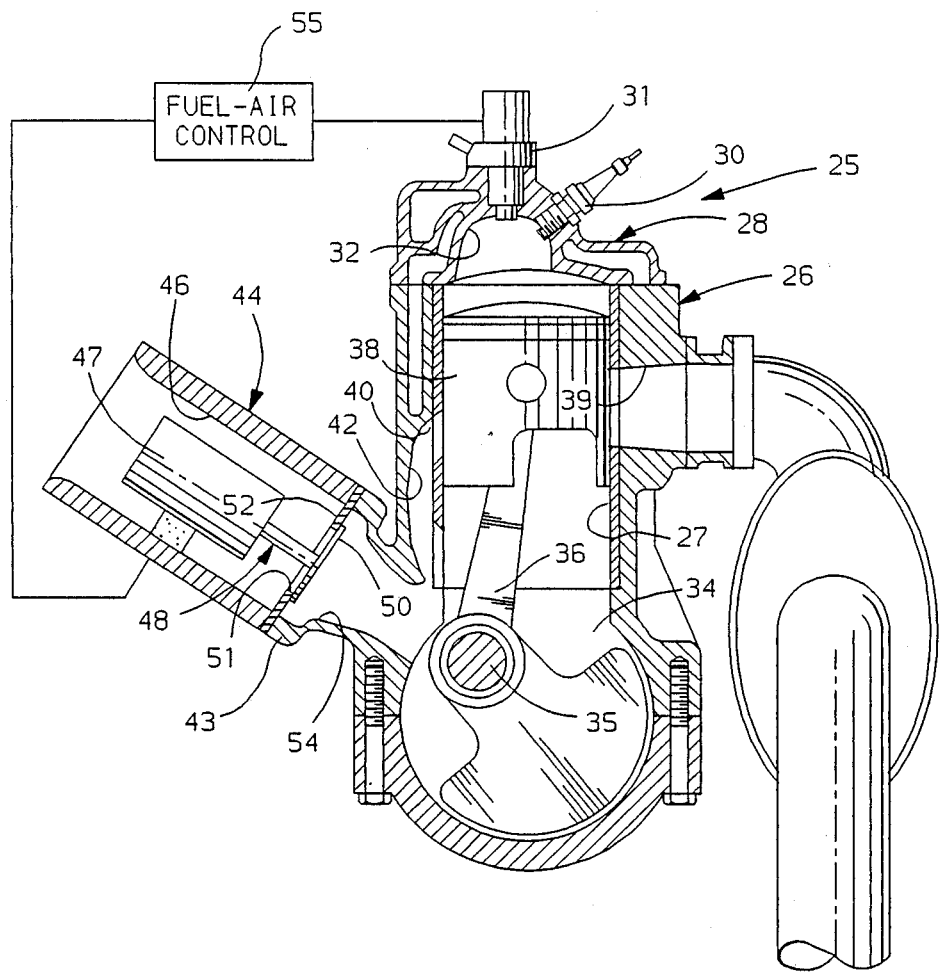
FIG. 3 is a cross-sectional view of a two cycle engine having solenoid actuated crankcase inlet valve means according to the invention.

In a preferred embodiment of the invention shown in FIG. 3, a spark ignited two cycle engine is generally indicated by numeral 25. The engine conventionally includes a cylinder block 26 having a plurality of cylinders 27, only one of which is shown. The cylinders are closed at one end by a cylinder head 28 having a spark plug 30 and fuel injector 31 cooperating with a combustion chamber recess 32 for each cylinder.

At their other ends, the cylinders 27 are each open to a separate crankcase chamber 34 in which a crankshaft throw 35 is driven by a connecting rod 36 connected with a piston 38 reciprocably movable in the respective cylinder 27. The piston controls the opening of at least one exhaust port 39 and intake port 40, the latter being connected by a transfer passage 42 to the crankcase chamber 34.

In place of the reed type intake check valves commonly used to admit air to the crankcase chambers of such two cycle engines, each chamber 34 has an air inlet fitting 43 that mounts a poppet valve housing 44. The housing 44 defines an air passage 46 in which is an electric solenoid 47 connected with poppet valve 48. The valve has a head 50 that normally closes an inlet opening 51 in an end wall 52 of the housing 44 to block the flow of air between the passage 46 and an adjoining inlet port 54 defined by the fitting 43.

Actuation of the solenoid to open the valve 48 is controlled by a control unit 55 such as an engine computer which connects with both the solenoid and the fuel injection system to control the timing of valve opening and the admission of air as a function of the fuel delivery and the related engine load.

In operation, as the engine fuel control, which can be a separate unit or incorporated in the control unit 55, varies the fuel delivery in response to the operator's demands for engine performance, i.e. the selected engine load, the control unit varies the opening time of the crankcase poppet valve to provide the proper amount of retained charge in the crankcase for delivery to the cylinder. Pumping work is reduced at part load as explained previously because the intake air is not throttled but is controlled instead by the timing of valve opening and closing.

If the engine is set up for skip-firing, as noted earlier, the omission of fuel delivery on a particular cycle is matched by the maintaining the valve 48 closed so that no new air is delivered to the crankcase on that cycle. Alternatively, the valve can be held open so that the air charge is expelled through the inlet and not delivered to the cylinder.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A two cycle engine having a cylinder fuel supply and crankcase scavenging with a crankcase air inlet for receiving scavenging and charging air,
   a poppet valve mounted in said inlet and operative to control the admission of air to the crankcase in accordance with the timing of open periods of the valve, and
   control means operative to vary the timing of the valve open periods as a function of fuel delivered by the fuel supply.

2. A two cycle engine as in claim 1 wherein said poppet valve is solenoid actuated.

3. A two cycle engine as in claim 1 wherein the valve open periods are varied in accordance with the engine load.

4. A two cycle engine as in claim 1 wherein the valve open periods are omitted during engine cycles when the fuel supply is cut off during skip firing of the engine cylinders.

* * * * *